June 5, 1962  E. C. MILLS ET AL  3,037,243
APPARATUS FOR USE IN THE MANUFACTURE OF VULCANIZED FOOTWEAR
Filed Feb. 20, 1958  11 Sheets-Sheet 1

INVENTORS
EDWARD CECIL MILLS
JOHN PATRICK BUCHANAN KEITH
By COREY, HART + STEMPLE
ATTORNEYS

INVENTORS
EDWARD CECIL MILLS
JOHN PATRICK BUCHANAN
KEITH
By Cosey, Hart & Stemple
ATTORNEYS June 5, 1962 E. C. MILLS ET AL 3,037,243
APPARATUS FOR USE IN THE MANUFACTURE OF VULCANIZED FOOTWEAR
Filed Feb. 20, 1958 11 Sheets-Sheet 3

INVENTORS
EDWARD CECIL MILLS
JOHN PATRICK BUCHANAN KEITH
By Cory, Hart & Hemple
ATTORNEYS June 5, 1962 E. C. MILLS ET AL 3,037,243
APPARATUS FOR USE IN THE MANUFACTURE OF VULCANIZED FOOTWEAR
Filed Feb. 20, 1958 11 Sheets-Sheet 4
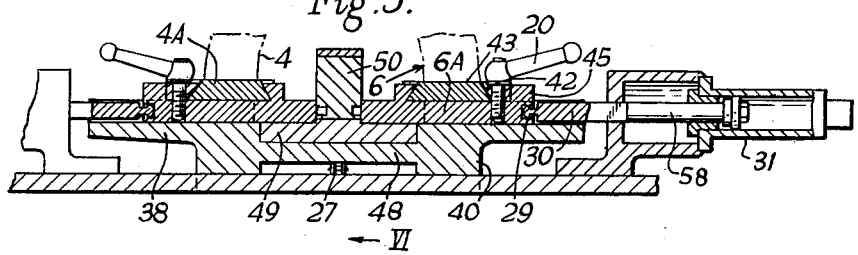
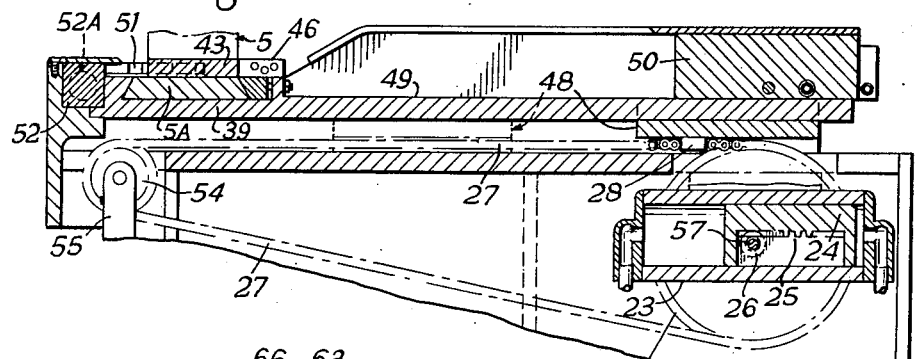
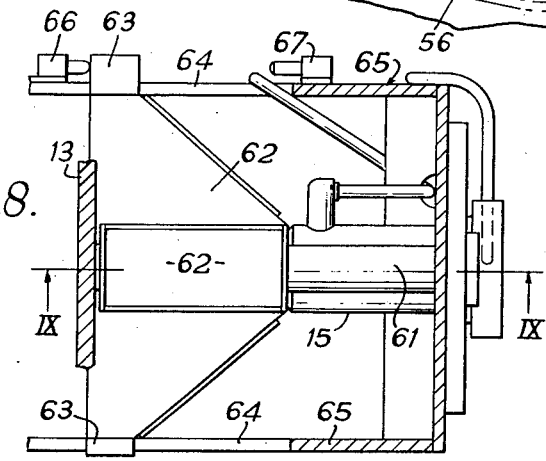
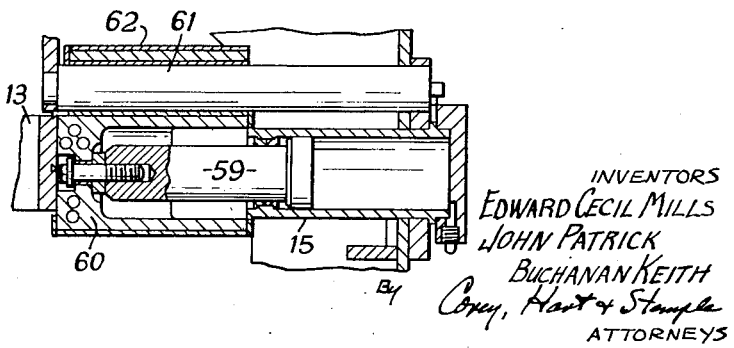
INVENTORS
EDWARD CECIL MILLS
JOHN PATRICK
BUCHANAN KEITH
By Corey, Hart & Stample
ATTORNEYS June 5, 1962  E. C. MILLS ET AL  3,037,243
APPARATUS FOR USE IN THE MANUFACTURE OF VULCANIZED FOOTWEAR
Filed Feb. 20, 1958  11 Sheets-Sheet 5

INVENTORS
EDWARD CECIL MILLS
JOHN PATRICK BUCHANAN KEITH
By Corey, Hart & Stemple
ATTORNEYS

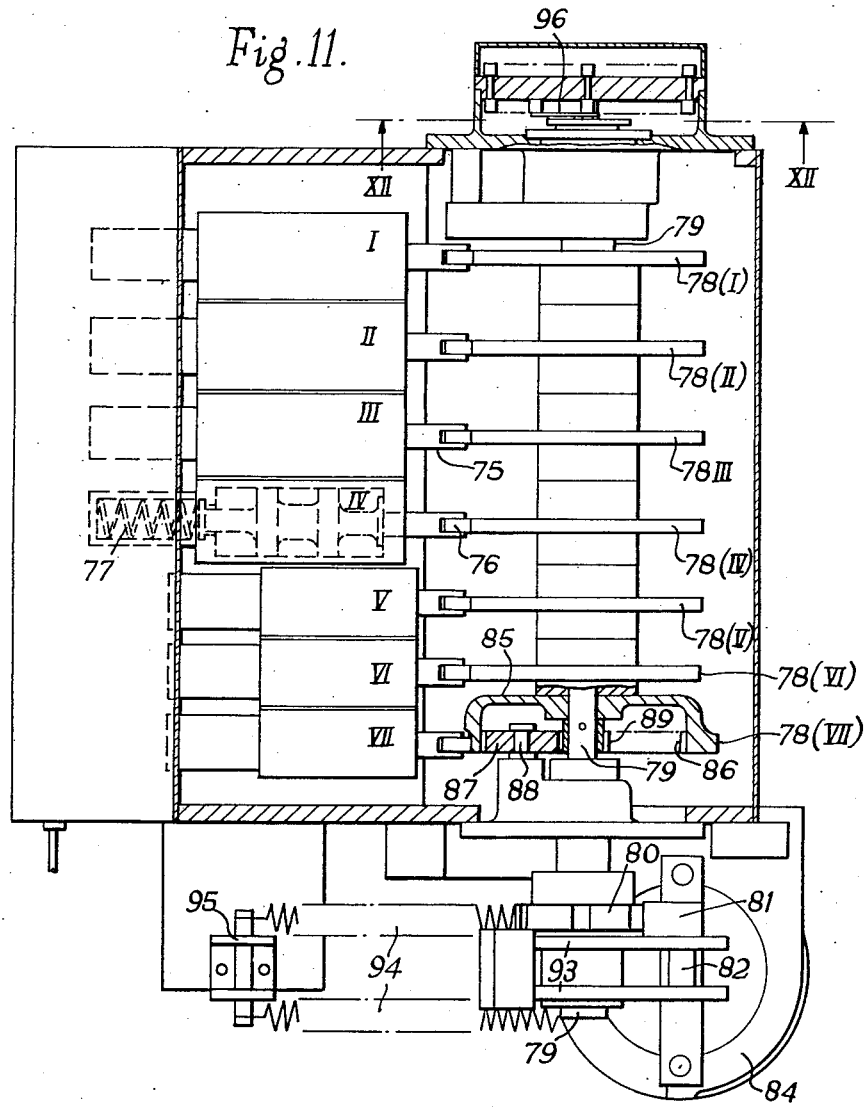

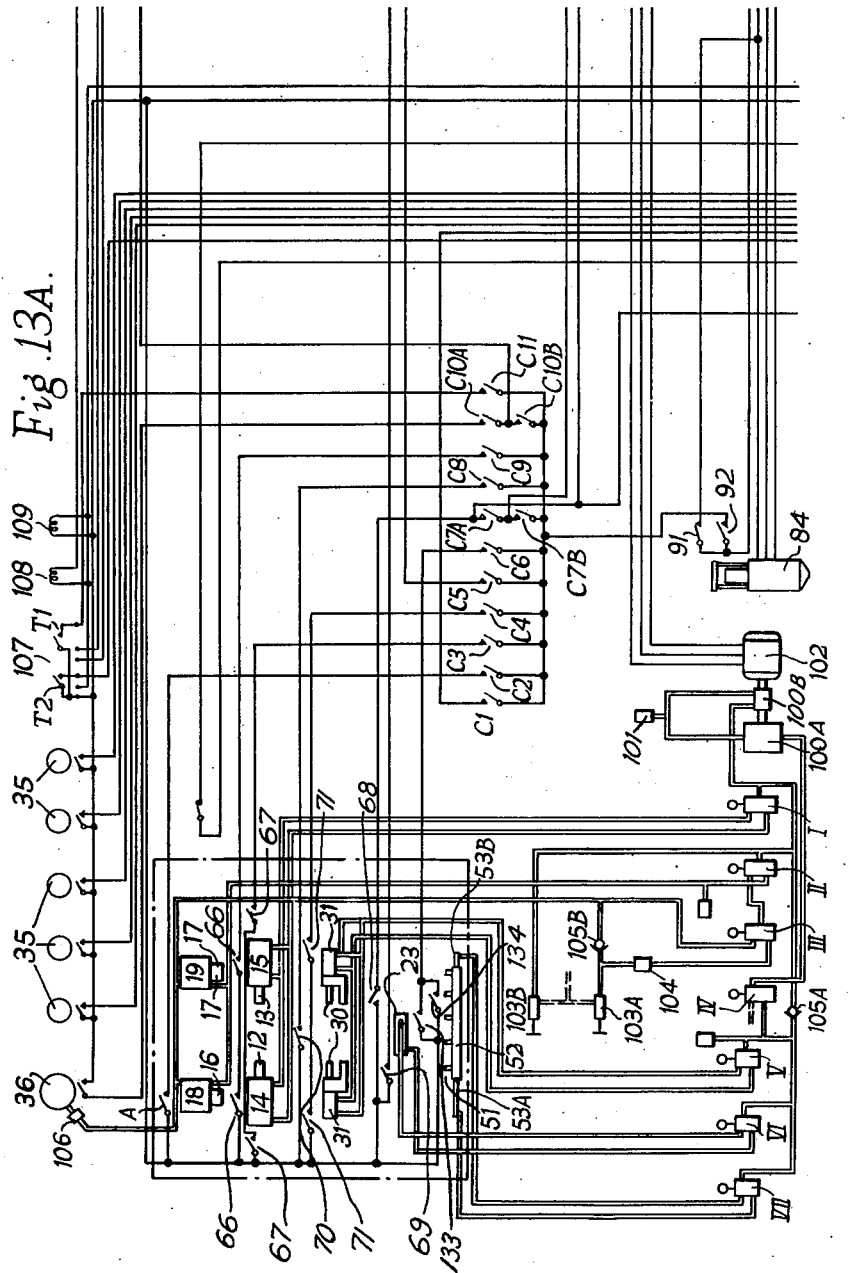

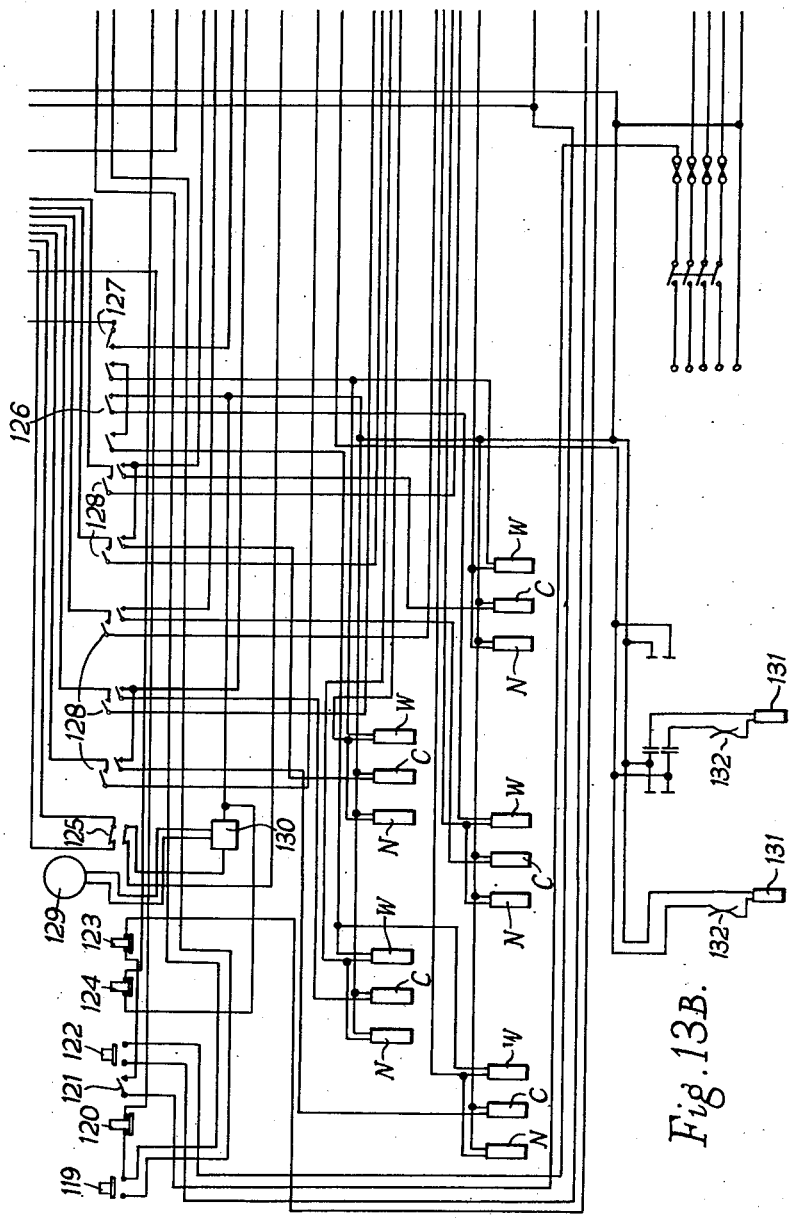

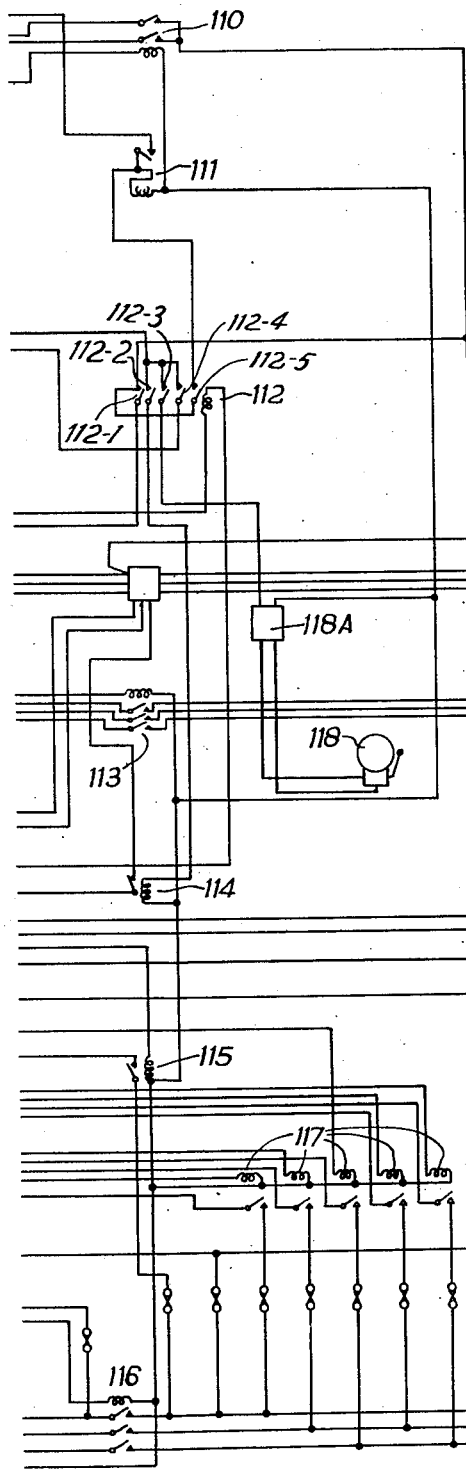

June 5, 1962   E. C. MILLS ET AL   3,037,243
APPARATUS FOR USE IN THE MANUFACTURE OF VULCANIZED FOOTWEAR
Filed Feb. 20, 1958   11 Sheets-Sheet 11

INVENTORS
EDWARD CECIL MILLS
JOHN PATRICK BUCHANAN KEITH

By Cony, Hart & Stemple
ATTORNEYS

United States Patent Office 3,037,243
Patented June 5, 1962

3,037,243
APPARATUS FOR USE IN THE MANUFACTURE OF VULCANIZED FOOTWEAR
Edward Cecil Mills, Bristol, and John Patrick Buchanan Keith, Somerset, England, assignors to C. I. C. Engineering Limited, Somerset, England, a British company
Filed Feb. 20, 1958, Ser. No. 716,383
8 Claims. (Cl. 18—17)

This invention is concerned with improvements in or relating to apparatus adapted for molding and simultaneously securing, by vulcanization, shoe soles of vulcanizable material to the undersides of pre-lasted shoe-uppers. The term "shoe" is used herein to indicate outer footwear generally, whether complete or only partly manufactured, provided the footwear has been soled. Prior to soling, the partly-made shoe will, for convenience, be referred to as an "upper."

The expression "sole" is to be construed as including, if desired, a heel in addition to the forepart of a shoe tread surface and also integrated extensions, such as walls or mudguards extending from the peripheral boundaries of the lower tread surface to embrace and adapted for securing to the upper.

The invention relates more specifically to apparatus of the kind having a plurality of heated molds each composed of divisible, mutually co-operable components and each adapted to contain a mass of unvulcanized elastomer (such as for example, natural or synthetic rubber or polymerizable derivatives thereof), the mass being molded to a required sole shape by pressure derived from a movable mold component and simultaneously engaged with the underside of a pre-lasted upper carried by a fixedly restrained last and constituting one boundary of the mold cavity. The molded sole is thus bonded to the said upper, during the vulcanizing cycle in which the mold components remain immobile.

Hitherto, apparatus of the above-mentioned kind has been provided in various mechanical combinations and has, in the main, required a considerable degree of supervision and manual operation, notwithstanding the introduction of power-operated or power-assisted mold components. The loading of the uppers (together with their supporting lasts) into the molding stations, the actuation of the last positioning and retaining means and the release and removal of the last and shoe subsequent to the completion of a molding vulcanizing cycle have generally been manually effected, either directly or through the medium of manually operated mechanical means. In consequence each molding and vulcanizing cycle has been followed by a comparatively lengthy period during which the mold structure complementary to the unloaded last remains vacant and inoperative.

The inoperative periods thus introduced, especially in cases where a single operative is employed to supervise a plurality of molds and/or apparatus, may represent a considerable proportion of the total "machine-on" time, and, moreover, may represent periods during which excessive physical demands are made upon the operator in the lifting, lowering, positioning and general manual displacement of the lasts to and from their operative positions. It is this latter factor which has encouraged, and in many cases, necessitated, the introduction of lasts constructed from light metal alloys in an endeavor to reduce the weight of the lasts and the mass of their attendant locating and locking devices. Shoe lasts for this purpose when so constructed do not, however, achieve the desired longevity nor possess the required resistance to the bending loads imparted by the co-operating sole pressing and molding means. A superior performance is generally obtained from lasts manufactured from cheaper, heavier and more durable materials.

The present invention therefore has for its primary object the provision of an improved, power-operated apparatus combining novel features which will permit the substanitally continuous repetition of molding and vulcanizing cycles, without the intervention of lengthy "mold-vacant" periods, and which will eliminate the necessity for the manual displacement and arrangement of the shoe lasts employed.

The present invention, according to one aspect thereof, provides an improved apparatus for molding and vulcanizing shoe soles of vulcanizable elastomers onto the undersides of pre-lasted shoe uppers comprising a plurality of lasts mounted for movement between a loading and unloading station and at least one molding and vulcanizing station, means for sequentially translating said lasts between said stations and means responsive to arrival of each last at a molding station to initiate automatically a molding and vulcanizing operation at that station.

This invention may also be considered from the aspect of providing shoe sole molding and vulcanizing apparatus comprising a plurality of slidably mounted lasts for supporting shoe uppers, power-actuated translating means adapted to slide said lasts in predeterminable sequence from a loading and unloading station each to one of two or more molding and vulcanizing stations and to return each last to said loading and unloading station upon completion of a molding and vulcanizing cycle, and power-actuated means adapted, upon the return of a last bearing a soled upper, to disengage the last from the said last translating means and to engage an adjacent last therewith prior to the repetition of an operating cycle.

According to a further aspect thereof, this invention may be viewed as providing shoe sole molding and vulcanizing apparatus comprising at least one molding and vulcanizing station, a plurality of laterally spaced fixed platforms, a movable platform positionable alongside of some at least of said fixed platforms, a plurality of last carriers slidable laterally between said fixed and movable platforms and power-actuated means for traversing said movable platform or platforms each with a last carrier thereon into and out of a molding and vulcanizing station wherein a shoe sole is attached to a shoe upper supported on the last mounted on a last carrier.

It is preferred to initiate the molding and vulcanizing operation by means responsive to the positive location of one or more lasts bearing unsoled uppers in their respective vulcanizing stations.

In preferred constructions of apparatus according to this invention the lasts are adapted to perform the following three translatory movements, viz.:

(a) Simultaneous traversing movement in a fore-and-aft direction on the part of alternately disposed lasts (for instance, in the case of the four lasts shown, this would be a traversing movement of the first and third lasts) between the loading and unloading station at the front of the machine and positions laterally adjacent sole molding and vulcanizing stations situated toward the back of the machine, the forward traverse laterally aligning the lasts with fixed components of the sole mold assembly, that is, the inner side molds; this movement is hereinafter termed the "last *traversing* movement," and includes the return traverse of lasts bearing soled uppers to the loading and unloading station;

(b) Lateral movement to advance forwardly traversed lasts one toward the other to position the shoe uppers thereon within the fixed inner side molds and in vertical alignment with the sole molding rams; this movement is hereinafter termed the "last *aligning* movement," and includes a lateral last retracting movement;

(c) Simultaneous lateral movement of all lasts at the loading and unloading station to change their positions in order to displace the returned lasts bearing soled shoes in relation to positions wherefrom the forward traverse movement takes place, and to replace them by alternately disposed lasts bearing uppers to be soled; this movement is hereinafter termed the "last *transfer* movement," and covers the reverse movement between successive sole molding and vulcanizing operation.

It will be understood that between successive advancing and retracting aligning movements of the lasts a molding and vulcanizing operation is performed for applying soles to the uppers on the aligned lasts, the period taken up by this operation affording sufficient time for removing soled uppers from lasts dwelling at the loading and unloading station and replacing them by unsoled uppers.

According to one form of the invention a shoe sole molding and vulcanizing machine employs fluid under pressure as a motive power and is provided with two molding and vulcanizing stations disposed disposed in parallel and adapted to mold and vulcanize soles on to shoe uppers offered on inverted lasts (that is, with the bottom faces of the lasts uppermost), the operation taking place substantially simultaneously at the two molding and vulcanizing stations. The apparatus comprises a ground-engaging main frame or base enclosing the fluid pressure controlling and directing apparatus for the actuation of the mold components and the translation of the lasts, as above described, and a head frame surmounting and secured to the aforesaid base and a sub-frame at the front of the base to support at least part of the last translating mechanism. The head frame has a substantially bridge-like configuration and serving as a major stress-absorbing member; this head frame houses the aforesaid vulcanizing stations and associated pressure applying means.

The working fluid is preferably a liquid, which may be derived from an exterior source, conveniently by the aid of pumping means contained within the said base, although pneumatic or hydropneumatic power may alternatively be employed for the actuation of some or all of the powered components.

The shoe upper supporting lasts, of which four are preferably employed and related two to each vulcanizing station, are grouped in a magazine structure at the loading and unloading station in a part of the sub-frame structure adjacent the operator's position at the front of the main frame or base. The sub-frame structure contains a reciprocatory mechanism to which the lasts are related and operatively connected and which serves to displace the magazine structure transversely and to index the lasts in sequence, for entry alternately into the sole molding and vulcanizing stations. The above-mentioned reciprocatory mechanism, is preferably fluid pressure operated and conveniently comprises a sectional rack, along which the ganged lasts are reciprocated, said rack having apertures or like means to receive in sliding engagement extended portions of the lasts and to support the said lasts in inverted condition and in axial parallelism. Preferably the reciprocatory mechanism employed to actuate the ganged last assembly comprises two fluid pressure motors arranged one at each end of the rack and operable alternately, in opposite sense, to displace the last assembly sequentially into each of two positions.

The first position ensures that the first and third of four ganged lasts are aligned with those portions of the rack which are arranged to be traversed toward the sole molding and vulcanizing stations and the second position, which is occupied subsequent to the return of the aforementioned lasts from the said molding and vulcanizing stations, aligns the second and fourth lasts in a similar manner, the first and third lasts being then positioned for the unloading of the completed shoes thereon.

The traversing movements of the lasts from the rack into the molding and vulcanizing stations and vice versa are also preferably effected by means of a fluid-pressure motor adapted when operated to displace an aligned pair of lasts into position between the spaced apart side mold components.

When the upper-supporting lasts have been thus traversed into position between the open mold components the last carriers engage with secondary translatory means for final, accurate alignment at the molding stations, as hereinafter more particularly described. These secondary translatory means are operable to displace the last carriers away from the path of traversing movement into positions in which the supported shoe uppers rest against fixed members of the side mold structure.

When occupying operative positions at the molding and vulcanizing stations each last carrier may be supported upon a fixed rigid member carried by the base, so that loads subsequently imparted by the sole pressing rams are isolated from the carrier traversing and aligning devices.

In order that the invention may be more readily understood a sole molding and vulcanizing machine, incorporating two molding stations served by four lasts, will now be described, by way of example, with reference to the accompanying drawings, wherein:

FIGURE 5 is a section on line V—V of FIGURE 4;

FIGURE 6 is a section on line VI—VI of FIGURE 4;

FIGURE 8 is a plan view of the side mold carrier assembly;

FIGURE 9 is a section on line IX—IX of FIGURE 8;

FIGURE 11 is a sectional plan on line XI—XI of FIGURE 10;

Figure 14:
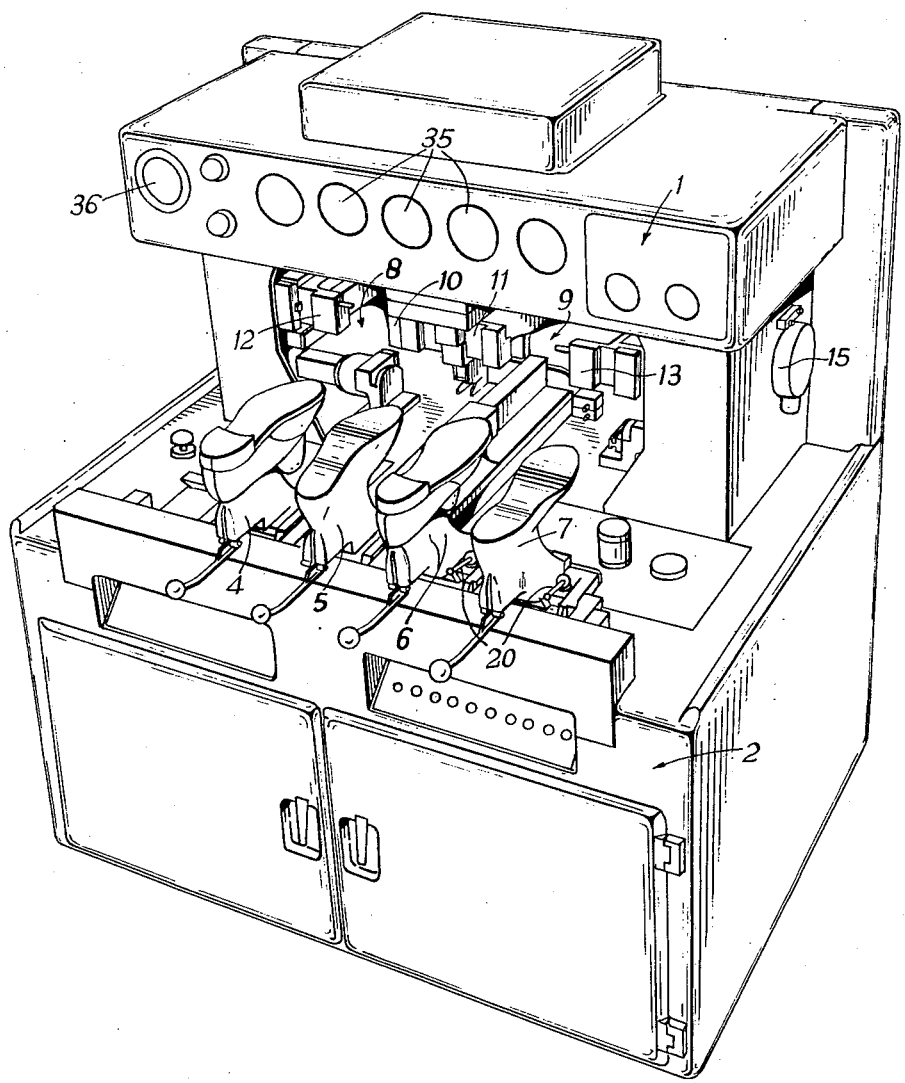
Figure 15:
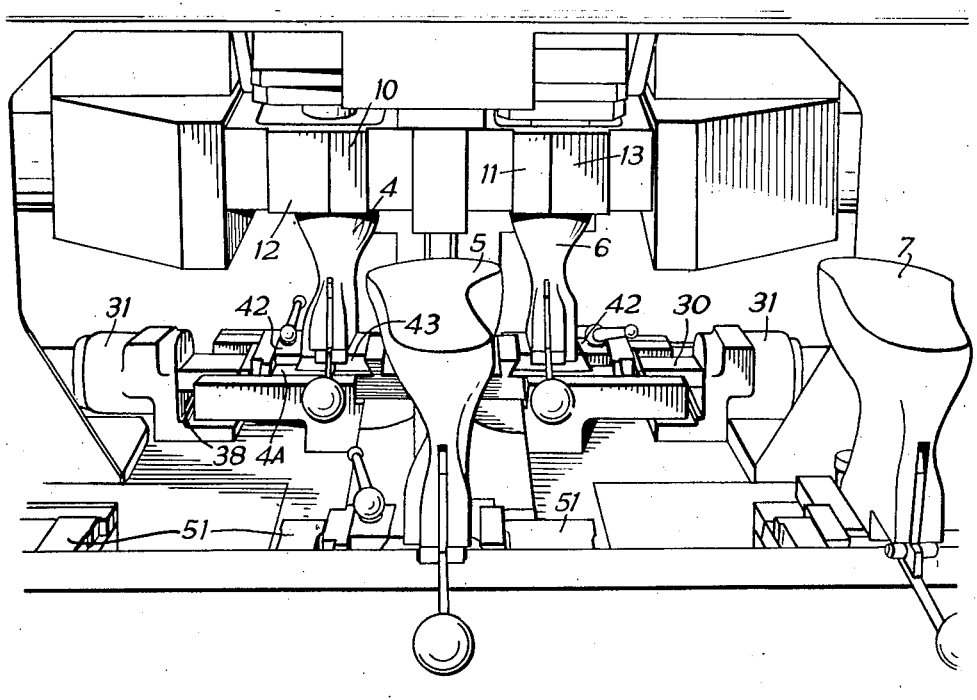

FIGURES 13A, 13B and 13C together constitute a diagram of the fluid and electric circuitry employed, these three figures being arranged as indicated in FIGURE 13D;

FIGURE 14 is a perspective view looking mainly toward the front of the machine and showing all four lasts at the loading and unloading station; and FIGURE 15 is an enlarged front perspective view showing two lasts in their molding stations and two lasts awaiting loading.

The machine illustrated in the accompanying drawings comprises a main or head frame 1 of bridge form surmounting a cabinet-type ground-engaging frame or base 2 which extends beyond the head frame 1 toward the position occupied by the machine operator and carries a sub-frame 3 which supports a sectional rack on which are slidably mounted four lasts 4, 5, 6 and 7 arranged with bottom faces uppermost.

Figure 1:
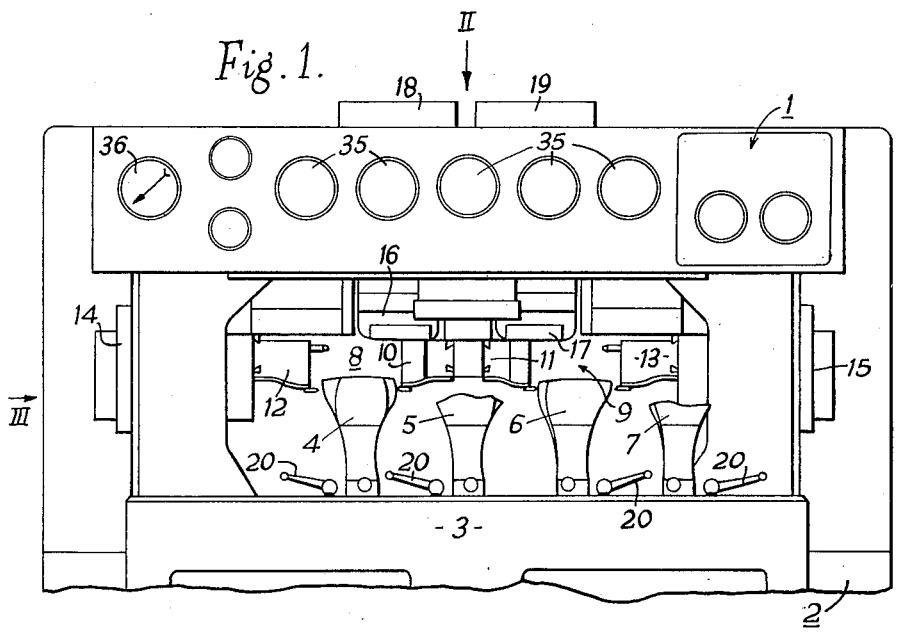
FIGURE 1 is a front elevation of the upper part of the machine, showing the four lasts at the loading and unloading station and the components of the molding station in the open position.
Figure 2:
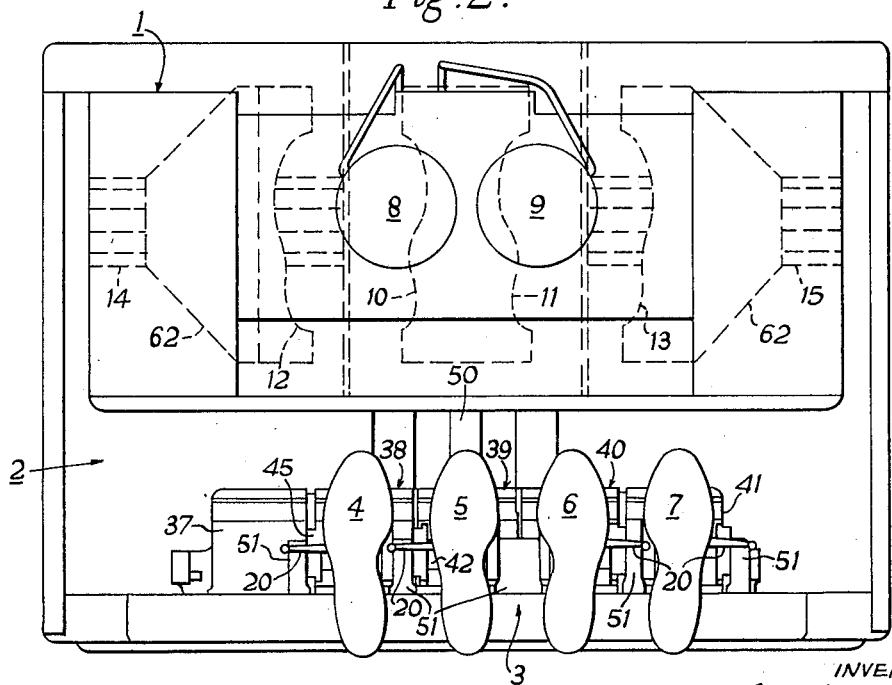
FIGURE 2 is a plan view looking in the direction of arrow 11, FIGURE 1.
Figure 3:
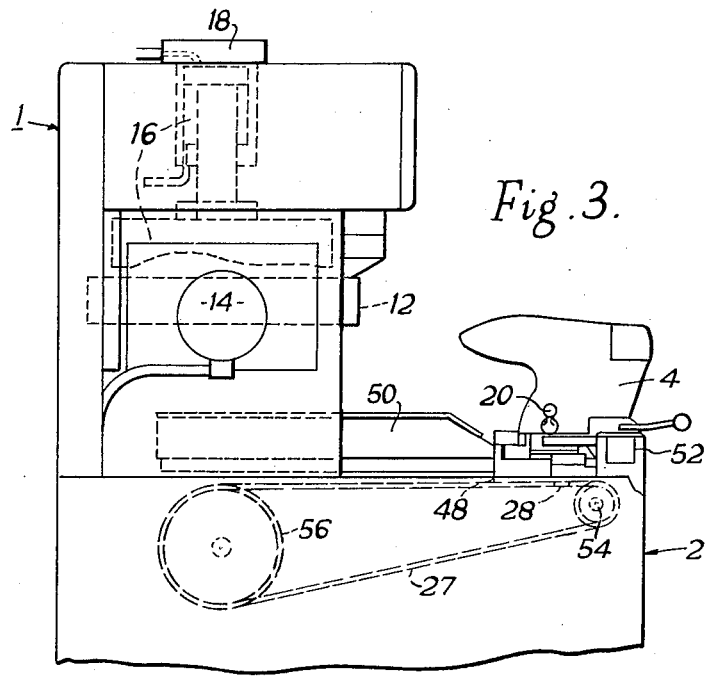
FIGURE 3 is an end view looking in the direction of arrow 111, FIGURE 1.
Figure 4:
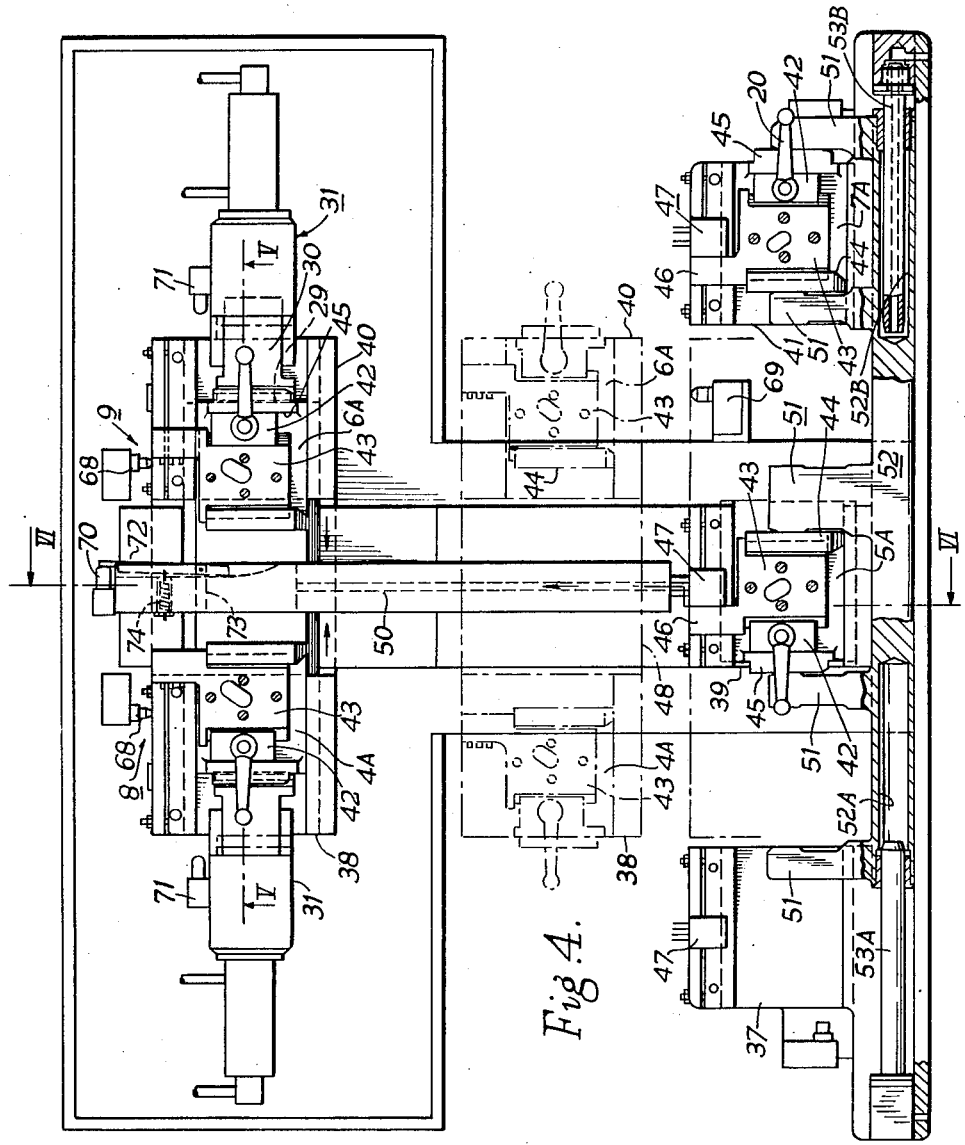
FIGURE 4 is a plan view illustrating the translatory movements of the lasts at the loading and unloading station and between that station and the molding and vulcanizing stations.

The sectional rack comprises five portions constituted by a central and two outer fixed platforms 39, 37 and 41, respectively, which are of identical width and are laterally spaced, equidistantly, to provide gaps within which to receive two intermediate movable platforms 38 and 40, identical in width with fixed platforms 37, 39, 41 (see FIG. 4). When the machine is at rest (see FIGS. 1 and 2) all four lasts 4, 5, 6, 7 are at the loading and unloading station, whereat the fixed rack platforms 37, 39, 41 are situated, and two lasts, for instance lasts 4, 6 are supported on the two intermediate rack portions, that is, on movable platforms 38 and 40, and the other two lasts (last 5, 7) are supported on two of the three fixed rack platforms 37, 39, 41—for instance on the center platform 39 and outer platform 41. Each of the four lasts 4, 5, 6, 7 is firmly secured to a slidable carrier 4A, 5A, 6A, 7A, respectively, by means of a locking screw 20 which clamps a keeper plate 42 onto one inclined edge of a dovetail-sectioned mounting plate 43 fixedly carrying the last. The other inclined edge of plate 42 engages under a tapered rib 44 secured to or formed on the appropriate last carrier, said carriers 4A, 5A, 6A, 7A being shown as supported at this particular time on rack platforms 38, 39, 40, 41. Each last carrier is also provided with an upstanding wall 45 between which and the last mounting plate 43 the keeper plate 42 is laterally confined.

Each last mounting plate 43 is provided with a forwardly extending coupling box 46 carrying electrical contact elements adapted to engage as the result of lateral movement complementary contact elements carried by an appropriate junction box 47 on each of the fixed rack platforms 37, 39, 41; these contacts elements form parts of electrical circuitry to be hereinafter described.

The movable rack platforms 38, 40 are preferably, as shown, interconnected for simultaneous last traversing movement by being formed as integral parts of a slide 48 which is restrained against upward displacement by an overlying retainer plate 49 on which is mounted a ridge bar 50.

In FIG. 4 the lasts are omitted for clearness and in FIG. 5 only the stems of lasts 4 and 6 are shown (in chain-dotted lines). The carriers 5A, 7A with the mounting plates 43 of lasts 5 and 7 are shown as positioned on rack platforms 39 and 41 respectively, whilst the carriers 4A, 6A with the mounting plates 43 of lasts 4 and 6 are shown (in chain-dotted lines) in course of forward traverse to positions adjacent the molding and vulcanizing stations 8, 9 respectively and also (in full lines) in the positions taken up as the result of the last-aligning advancing movement.

It will be seen in FIG. 4 that the ribs 44 and walls 45 are disposed in opposite hand positions on last carriers 5A and 7A and are snugly held against relative lateral displacement by fingers 51 extending from a transfer bar 52 mounted for reciprocatory movement across the front of the machine. The opposite ends of bar 52 are fashioned to serve as cylinders 52A, 52B and cooperate with fixed hollow rams 53A, 53B, so that the controlled admission of fluid to the rod cylinders results in lateral displacement of bar 52 to effect transfer of the last carriers when confined between the transfer fingers 51.

The traversing movement of last carriers on slide 48 is effected by endless roller chain 27 secured by anchorage block 28 to the underside of slide 48 (see FIGS. 5 and 6), said chain 27 partially embracing and extending in a fore and aft direction between a sprocket wheel 54 journalled from free rotation in a bracket 55 located at the front centre of the machine—adjacent but below transfer bar 52—and a sprocket wheel 56 located below and substantially intermediately of the molding and vulcanizing stations 8, 9. The spindle 57 of sprocket wheel 56 extends diametrically through a fluid cylinder 23 and transversely in relation to the longitudinal axis of said cylinder 23, which axis lies parallel to the runs of chain 27. On the portion of the sprocket wheel spindle 57 within cylinder 23 is secured a toothed pinion 26 in constant mesh with a toothed rack 25 cut in a gap formed in a floating piston 24 slidably housed in cylinder 23. Admission of fluid under pressure to and exhaustion of fluid from opposite ends of cylinder 23 effects reciprocation of piston 24 which through its rack 25 and the pinion 26 on spindle 57 causes the chain 27 to traverse slide 48 forwards and backwards.

As the slide 48 under the pull of chain 27 approaches the end of its forward stroke the T-sectioned ends of web members 30 constituting extensions of rams 58 are laterally engaged by and enter complementary recesses 29 in the wall 45 of the two last carriers being carried at that time by slide 48 (that is, carriers 4A, 6A). The slide 48 comes to rest (piston 24 having reached the forward limit of its stroke in cylinder 23) when the web ends have fully entered in carrier wall recesses 29. The rams 58 are then moved by pressure of fluid admitted to cylinders 31 to effect the inward last aligning movement, that is, to move the carriers 4A, 6A laterally one toward the other into the full line positions shown in FIG. 4, whereat the uppers carried by lasts 4, 6 are vertically aligned beneath sole pressing rams 16, 17 depending from fluid cylinders 18, 19 respectively.

Instead of using two separate cylinders 31 and rams 58 a single fluid motor may be employed to effect simultaneous aligning movement of the two last carriers on slide 48.

The laterally inward movement of last carriers 4A, 6A bring shoe uppers carried on the corresponding inverted lasts 4, 6 respectively into close contact with fixed open-side mold members 10, 11 respectively, and when the lasts 4, 6 have completed or soon after they have commenced their last aligning movements, complementary movable open-side mold members 12, 13 are given a follow-up movement, resulting in the embracing of the undersides of the two last-supported uppers within closed side molds constituted of mold members 10, 12 and 11, 13 respectively. The side mold components 10, 11, 12, 13 each have superimposed sealing knives of conventional form adapted to engage the periphery of a shoe upper when closed thereupon and to determine the configuration of the finished sole edge, imitation welt, stitching, or mudguard line in known manner. Movement of side mold members 12, 13 to close and open the side molds is effected by means of fluid motors comprising cylinders 14 and 15, plungers 59 slidable therein (FIGS. 8 and 9), carriers 60 secured to and between said plungers 59 and the movable side mold members 12, 13, slide bars 61 on which said carriers 60 are suspended, and flatly disposed winged steadying plates 62. The plates 62 have tip blocks 63 slidable within guide slots 64 in parallel walls 65. One of said blocks 63 is adapted to actuate micro-switches 66, 67 to signify when operated arrival of the side mold members 12, 13 in the fully closed and fully open positions respectively.

The two sole molding and pressing rams 16 and 17, depend within the frame head 1 one into each of the mold cavities constituted by the aforesaid side mold components 10, 11, 12 and 13 and are simultaneously operated by admission of pressure fluid into the cylinders 18, 19 of the double acting fluid motors. Power transmission between each motor ram and its appended sole molding piston is preferably effected by means of a semi-universal link (not shown) permitting limited angular and lineal variations between the axes of the two components and allowing of accurate alignment of each sole mold ram 16 or 17 with the associated mold cavity.

The machine is provided with electrical control circuitry to control sequential operation of various fluid motor units which effect opening and closing movements of most of the movable components of the machine associated with last changing and sole molding operations. For instance, switches 68, 69 respectively (FIG. 4) signify, when operated, arrival of slide 48 to position the last carriers thereon in lateral alignment with the sole molding stations, and return of the slide 48 at the last changing station, whilst switches 70, 71 respectively signify, when operated, arrival of the last carriers and upper-supporting lasts thereon vertically beneath the sole molding rams 16, 17 and return of the last carriers, after sole molding, at positions wherefrom return traverse to the last changing station can be effected; switch 70 is operated through an armature 72 pivoted to a rod 73 inserted in ridge 50, said armature 72 being biased by a spring 74 toward the associated last carrier.

Figure 10:
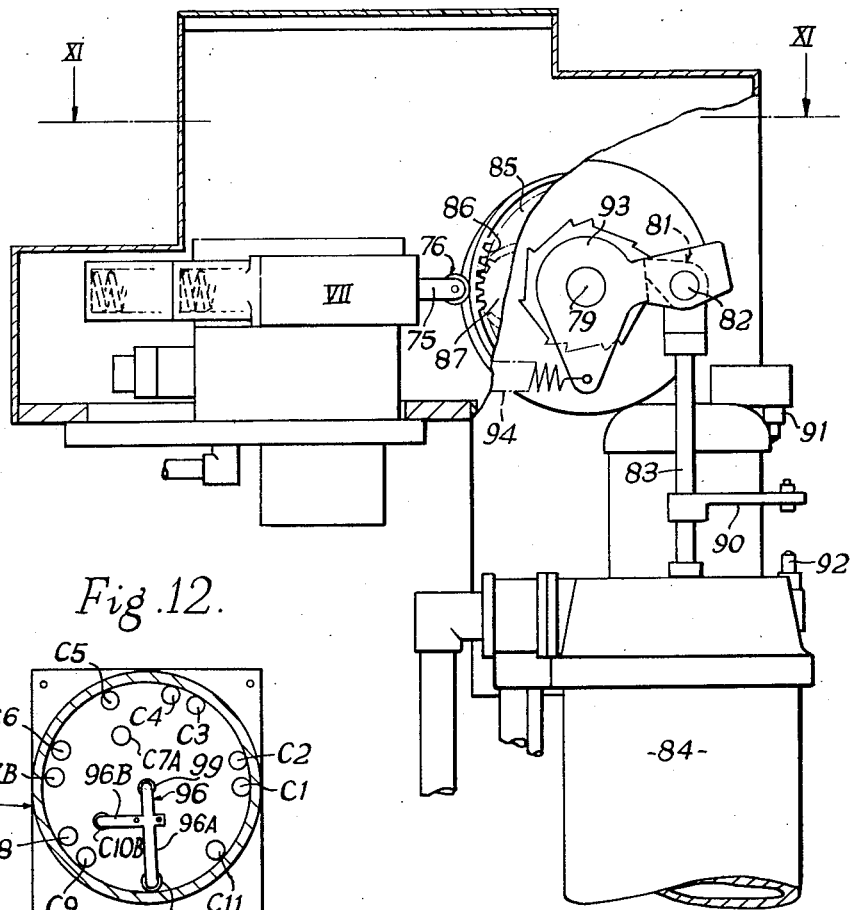
FIGURE 10 is a part-sectional, fragmentary elevation of cam-operated valves and electric selector mechanism used in the automatic control of the machine.

The cycle of operations of the machine is controlled and predetermined by the cooperative actions of a bank of fluid valves and a rotary electrical sequence switch; the motive power for operation is supplied by a fluid cylinder unit known generally under the trade name "Thrustor." The valve bank comprises a series of fluid control valves designated I to VII inclusive (see FIGS. 10 and 11), each control valve having a plunger 75 carrying a follower roller 76 biased by spring means 77 to maintain contact with an edge cam 78. For convenience and where suitable the cam reference characters (78) are followed in parentheses by the number of the associated valve, for example—78(III). Six of the cams, that is, cams 78(I) to 78(VI) inclusive, are keyed to a common shaft 79 which carries also a ratchet wheel 80 to which latter a stepped rotary movement is imparted by a pawl 81 mounted by pivot 82 on the outer end of the plunger 83 of the thrustor 84. The cams 78(I) to 78(VI) are plain disc cams, but cam 78(VII) is constituted by the peripheral flange of a drum 85 in which is provided an internal gear 86. A toothed planetary pinion 87, freely rotatable on a fixed axle 88, is in constant mesh with a sun pinion 89 secured to shaft 79, the proportions of this reduction gear assembly being such that cam 78(VII) rotates at half the speed of shaft 79 and of the other cams fixed thereto. The corresponding low speed valve VII is used for control of the last-transfer movements, effected by cooperation of transfer rams 53A, 53B and the cylinders 52A, 52B of the last carrier transfer rod 52. The thrustor plunger 83 carries a contact arm 90 adapted to operate, toward the limits of plunger stroke in opposite directions, two microswitches 91, 92 respectively. The pivot 82 of thrustor pawl 81, in addition to its connection with plunger 83 is connected to paired rockers 93, swingably supported by shaft 79, said rockers 93 being connected also to bias springs 94 anchored to a fixed bracket 95.

Figure 12:
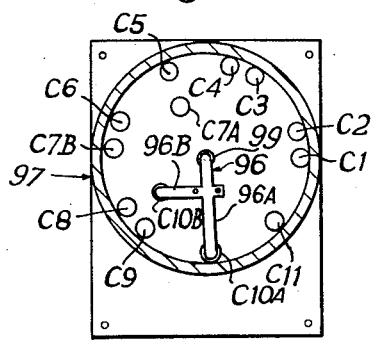
FIGURE 12 is a section on line XII—XII of FIGURE 11.

The rotary electrical sequence switch previously referred to comprises a wiper arm 96 (FIGS. 11 and 12) having a main limb 96A and a side limb 96B each carrying a wiper stud. The wiper arm 96 (which is secured to the end of shaft 79 remote from that carrying ratchet wheel 80) has a central pick-up terminal 99, that is, coaxial with the axis of shaft 79, and said arm is adapted by its limbs to wipe over circumferentially spaced contacts C1–C6, C7A, C7B, C8, C9, C10A, C10B and C11; contacts C7A and C10B are wiped by the wiper stud of limb 96B—the remainder by the wiper stud of limb 96A.

In the fluid and electrical circuitry diagram (FIGS. 13A, 13D) the main mechanical and electrical components of the machine, previously referred to, are diagrammatically illustrated, and these bear the same reference characters as already employed. In addition these figures depict diagrammatically other mechanical and electrical components used and which are not elsewhere illustrated; in particular these figures illustrate the connecting by means of pipelines to low-pressure and high-pressure pumps 100A, 101B respectively (with common suction strainer 101), through the cam-operated control valves I . . . VIII, of the side mold cylinders 14 and 15, the sole mold cylinders 18 and 19, the last aligning cylinders 31, the last traversing cylinder 23, and the transfer rod cylinders 52A, 52B. The pumps 100A, 101B are driven by a common electric motor 102 and a number of ancillary components are shown, viz., adjustable relief valves 103A and 103B, an orifice valve 104, and non-return valves 105A and 105B including fluid pressure gauge 36 with an associated pulsation damper 106. The electrical circuitry, in addition to the sequence switch contacts C1 . . . C11, and switches 68, 69, 70, 71, previously referred to, includes a timer mechanism 107, "flash" and "machine on" indicator lamps 108, 109 respectively, impulse and flasher relays 110, 111 respectively, a main relay 112, and other relays 114 and 116, a mercury switch 115, a bank of relays 117, a signal bell 118 with transformer 118A, "pump on" and "pump off" press-buttons 119, 120 respectively, a motor start switch 113 (linked with press-buttons 119, 120), an "auto start" switch 121, "machine on" and 'machine off" switches 122, 123 respectively, a "reload" switch 124, various "warm up" switches 125, 126 and 127, heater switches 128, a recorder 129 and transformer rectifier 130. Dial-indicator controllers 35 associated with the sole and side mold members are also shown.

Figure 7:
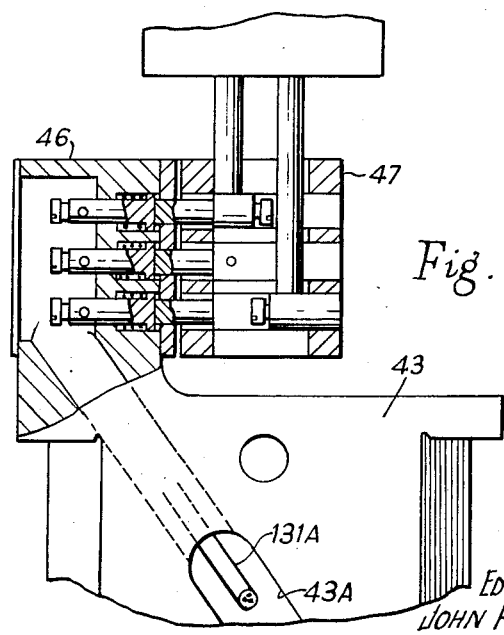
FIGURE 7 is a fragmentary view showing switch gear at the loading and unloading station for warming waiting lasts.

The mold components of the machine are adapted to be heated to varying extents, it being convenient to employ embedded electrical resistance heaters. Each of the sole rams 16, 17 and of the movable outer side mold members 12, 13 and the composite fixed side mold members 10, 11 have three such embedded heaters, designated by the addition of suffix letters W, C and N to indicate respectively "warm up" heaters, "control" heaters and 'normal" (or "constant") heaters. The two lasts which are dwelling at the last changing stations (for example, lasts 5 and 7, FIG. 4) are warmed by connecting last heaters 131 with power mains through the complementary plug and socket contact elements carried by coupling boxes 46 and junction boxes 47 respectively (FIG. 7), these contact elements being engaged and disengaged automatically by the transfer movements of the last carriers as they are slid on and off the fixed and movable sections of the loading station rack; for protective purposes the last heaters 131 are fitted with thermostats 132; the last heater cables 131A (see FIG. 7) connect with coupling boxes 46 through ducts 43A formed in mounting plates 43.

For the purpose of describing the operation of the machine it will be assumed that a pair of lasts are in the two molding and vulcanizing stations with rubber or other elastomeric sole blanks confined in the molding cavities constituted by the lasts and uppers thereon and the side molds and sole rams. When two shoe soles are being thus molded and vulcanized the contact T1 of timer 107 will be closed and control valves I, II and III will have been operated to pass high pressure fluid to the side mold cylinders 14, 15 and sole ram cylinders 18, 19. It is to be understood that during vulcanization two fluid pressures are employed and at this juncture it is assumed that the higher pressure is being applied and that the vulcanizing period is approaching completion.

On completion of the cycle the timer 107 supplies current through its contact T2, the closed warm-up switch 125 and the closed contact T1 to the thrustor 84, via main relay 112, the outstroke of the thrustor plunger 83 operates through ratchet wheel 80 and pawl 81 to the cam shaft 79 and the wiper contact arm to close the contact C2 and to operate valve II. Pressure fluid is thus supplied to the lower ends of the sole ram cylinders 18, 19 to raise the rams 16 and 17, while the pressure applied to the slidable side molds 12 and 13 remains constant. Complete retraction of both rams 16, 17 permits the microswitch 150 to close and current is thus passed via the contact C2 to energize the thrustor 84 and operate valve I for opening the side molds 12, 13; switch 150 is mechanically linked to one or other or both the sole rams 16, 17 for operation thereby. During rotation of the sequence switch for the above operation the contact C3 is closed; on retraction of the side molds 12, 13 the microswitches 66 and 67 are closed. It will be noted that during side mold opening the delivery from the high pressure pump 101B may be augmented by the higher volume output of the low pressure pump 100A, the fluid passing via valve IV and the non-return valve 105A.

Current is then passed via the previously closed contact 3 to energize the thrustor 84 which then operates valve V to deliver low-pressure fluid to cylinders 31. Simultaneously the contact C4 is closed and when the lasts are moved sideways from the centre side molds 10, 11 the two microswitches 71 are closed to convey current via contact C4 to the thrustor 84, the operation of which opens valve VI. The traversed lasts at this stage are connected through their carriers with the slide 48 operated by the chain wheel cylinder 23, the actuation of which—subsequent to the opening of valve VI—moves the lasts toward the front of the machine. The contact C5 is closed when valve VI is operated; the closure of microswitch 69 by slide 48 passes current via the normally closed contact 112–4 of the interconnected relay 112 through contact C5 for a further thrustor movement.

Valve VII is thus operated and the sequence switch moves on to close contact 6. The transfer rod 52 is thus operated to align the other two lasts to be operated with the slide 48. Either of microswitches 133 or 134 are then closed passing current via the previously closed contact C6 to move the thrustor 84 a further step. Valve VI is thus reversed, contacts C7A and C7B are closed, and the last traversing mechanism moves the two fresh lasts towards the molding and vulcanizing stations.

Termination of the stroke of chain wheel piston 24 closes the switch 68. When this switch 68 is closed the electric current supply is connected via closed contacts C7A and C7B of the sequence switch to the thrustor 84. The reload switch 124 and thus the relay 112 is energized.

Contact 112–5 of the relay 112 then supplies the "flashing" indicator lamp 108 (preferably colored yellow) via the flasher relay 111; contact 112–4 is normally closed and thus is now open while contact 112–1 is the self holding contact.

Closure of switch 68 energizes the thrustor 84 to shift the sequence switch 97 again so as to close contact 8 and to operate valve V, thereby effecting the last traversing movement which moves the lasts toward their respective positions adjacent the central side mold members 10, 11.

The microswitch 70 is then closed, current passes via previously closed contact C8 to the thrustor 84 thereby operating valve I to close side molds 12, 13 and to close contact C9. During side mold closure fluid from the low pressure pump 100A—being of greater volume than that from the high pressure pump 100B—is passed via valve IV and the non-return valve 105A to assist in closure. Final closure employs high pressure fluid only; the non-return valve 105A closes the associated pipeline and the low pressure output exhausts into a fluid reservoir which is integral with the valve structure, by means of the relief valve 103A.

Closure of switches 66 again moves the thrustor 84 and supplies current via the previously closed contact C9, to close contacts C10A and C10B and to open valve III for the supply of fluid to the sole mold cylinders 18, 19. The previously actuated valve I remains open.

When the sole molds abut the last-supported uppers a pressure rise occurs; at 275 lb. per square inch a switch contained in the pressure gauge 36 is closed automatically and the molding and vulcanizing cycle is initiated by means of the impulse relay 110. Simultaneously current is passed via the closed contacts C10A and C10B to effect thrustor movement and thereby displace the valve III into a condition in which pressure fluid is passed only through the pipeline branch containing the orifice valve 104, the relief valve 103A (0–500 pounds) and the non-return valve 105B. At the same time contact C11 is closed.

During the period set by that portion of the timer 107 (settable for operation period of between 5 secs. and 5 mins.), fluid at the pressure to which it has been reduced by valve 103A is supplied to the sole mold cylinders 18, 19 while the orifice valve 104 maintains a high pressure, determined by the relief valve 103B (0–1500 pounds) on the upstream side and thus through valves III and II to the side mold "closed" conduit.

At the termination of the low pressure period the contact C1 is closed; this passes current via contact C11 of the sequence switch to displace the thrustor 84 and thus the valve III to interrupt communication and to direct high pressure fluid direct to the sole mold "down" conduit. Contact C1 of the sequence switch is thus closed. On the termination of the vulcanizing cycle the contact T2 of the timer 107 is closed and current is passed via contact T1 to effect unloading and the continuation of a fresh vulcanizing cycle.

Provision is made, as follows, to prevent the re-entry of a vulcanized pair of uppers into the molds.

The inward stroke of the chain wheel closes switch K and thus energizes the relay 112. Under these conditions, as already indicated, the contact 112–5 of the relay supplies to the flashing indicator lamp 108 via the flasher relay 111 and the contact 112–4 which is normally closed is held open. The contact 112–1 is self holding. If the relay 111 is allowed to remain energized the following cycle will be terminated upon the return of the operated lasts to the front of the machine.

With the contact 112–4 of the relay 112 open the current supply to contact 5 of the sequence switch, after closing of the switch 69, is interrupted. Contacts 112–2 and 112–3 of the relay are closed, however, and current is thus passed via the transformer 118A to operate the signal bell 118 and to the relay 114 to interrupt, via starter the current supply to the pump motor 102.

Depression of the reload button 124 at the appropriate time will, of course, deenergize relay 112.

Each last contains one thermo-statically controlled heater 131 (of say 600 watts) which is brought into operation by the plug and socket connections provided so that the lasts may be heated only when at the front of the machine on the rack 3. Current is supplied from the live mains via the mercury switch 115 (controlled by manually operable switch 127) and by switch K when the latter is closed. Those lasts remaining at the front of the machine are, therefore, only heated when the corresponding pairs are entered in the molds, this being sensed by switch 70 being operated by the forward movement of the slide 48.

We claim:

1. Apparatus for mechanically transporting lasts into and out of adjacently situated molds, comprising in combination, a vulcanizing station provided with a plurality of molds having adjacently situated mold cavities, a loading station spaced from said vulcanizing station and carrier means operable along a line of travel between said stations, a pair of lasts for each mold cavity, a movable support block for each of said lasts, a last carrier disposed transversely to said line of travel and slidably receiving said support blocks so that they may be positioned in aligned relation thereon transversely of said line of travel, said last carrier comprising three spaced block supporting platforms fixed relative to said last carrier and two spaced block supporting platforms movable relative to said last carrier and forming part of said carrier means, said movable platforms being located between said fixed platforms when said platforms are in aligned condition, first reciprocal drive means for moving said support blocks in said aligned relation transversely of said line of travel to move either one pair of said lasts or the other pair thereof onto said movable platforms of said carrier means, second reciprocal drive means for moving said carrier means along said line of travel to bring the pair of last supporting blocks carried thereby into the region of said molding cavities, means responsive to the arrival of said carrier means in the region of said molding cavities for transversely moving said support blocks carried by said carrier means toward one another to move the lasts thereof into said mold cavities and for operating said molds to close said cavities, means controlled by the opening of said molds at the end of a molding operation for actuating said responsive means and said second reciprocal drive means to cause the withdrawal of said last support blocks from said molding cavities and the return of said carrier means therewith to said loading station, and means operable on the arrival of said carrier means at said loading station to actuate said first reciprocal drive means to move said last support blocks transversely to move said returned support blocks transversely off said movable platforms of said carrier means and onto two of said fixed platforms, and to move the other two support blocks for the other pair of lasts off two of said fixed platforms and onto the two movable platforms of said carrier means.

2. Apparatus for mechanically transporting lasts into and out of adjacently situated molds, comprising in combination, a vulcanizing station provided with a plurality of molds having adjacently situated mold cavities, a loading station spaced from said vulcanizing station, and guide means extending from said vulcanizing station to said loading station, a pair of lasts for each mold cavity, a movable support block for each of said lasts, a last carrier disposed transversely to said guide means and slidably receiving said support blocks so that they may be positioned in aligned relation thereon transversely of said guide means, first reciprocal drive means for moving said support blocks in such aligned relation transversely of said guide means to move either one pair of said lasts or the other pair thereof into cooperative relation with said guide means, second reciprocal drive means for moving said support blocks carrying the pair of lasts in cooperative relation with said guide means, along said guide means into the region of said molding cavities, means responsive to the arrival of said last support blocks in the region of said molding cavities for transversely moving said support blocks toward one another to move the lasts thereof into said mold cavities and for operating said molds to close said cavities, means controlled by the opening of said molds at the end of a molding operation for actuating said responsive means and said second reciprocal drive means to cause the withdrawal of said last support blocks from said molding cavities and along said guide means to said loading station, and means operative on the arrival of said returning last support blocks at said loading station to actuate said first reciprocal drive means to move said last support blocks transversely to move said returned support blocks out of cooperative relation with said guide means, and to move the other two support blocks for the other pair of lasts into such cooperative relation in position to be moved toward said molding cavities.

3. Apparatus for mechanically transporting lasts into and out of adjacently situated molds, comprising in combination, a vulcanizing station provided with a plurality of molds having adjacently situated mold cavities, a loading station spaced from said vulcanizing station, and guide means extending from said vulcanizing station to said loading station, a pair of lasts for each mold cavity, a movable support block for each of said lasts, a last carrier disposed transversely to said guide means and slidably supporting said support blocks in aligned relation thereon transversely of said guide means, first means for moving said support blocks in such aligned relation transversely of said guide means to move either one pair of said lasts or the other pair thereof into cooperative relation with said guide means, second means for moving said support blocks carrying the pair of lasts in cooperative relation with said guide means, along said guide means to positions laterally adjacent to said mold cavities, third means operable on the arrival of said last support blocks at said lateral positions to transversely move said support blocks toward one another to move the lasts thereof into said mold cavities and to close said mold cavities, said support blocks and said third means being provided with members engageable in interlocked relation to releasably connect said support blocks to said third means during the transverse movements of said support blocks relative to said mold cavities, means operable at the end of a molding operation to actuate said third means to transversely move said support blocks away from said mold cavities to said lateral positions and to actuate said second means to move said support blocks from said lateral positions and along said guide means to said loading station, said interlocking members breaking their interlocked relation to enable the return of said support blocks from said lateral positions to said loading station, and means operative on the arrival of said returning last support blocks at said loading station to actuate said first means to move said last support blocks transversely to move said returned support blocks out of cooperative relation with said guide means, and to move the other two support blocks for the other pair of lasts into such cooperative relation in position to be moved toward said molding cavities.

4. Apparatus for mechanically transporting lasts into and out of adjacently situated molds, comprising in combination, a vulcanizing station provided with a plurality of molds having adjacently situated mold cavities, a loading station spaced from said vulcanizing station, and guide means extending from said vulcanizing station to said loading station, a pair of lasts for each mold cavity, a movable support block for each of said lasts, a last carrier disposed transversely to said guide means and slidably supporting said support blocks in aligned relation thereon transversely of said guide means, first means for moving said support blocks in such aligned relation transversely of said guide means to move either one pair of said lasts or the other pair thereof into cooperative relation with said guide means, second means for moving said support blocks carrying the pair of lasts in cooperative relation with said guide means, along said guide means to positions laterally adjacent to said mold cavities, third means operable on the arrival of said last support blocks at said lateral positions to transversely move said support blocks toward one another to move the lasts thereof into said mold cavities, means on said support blocks and said third means and engageable in interlocked relation in the region of said lateral positions to connect said support blocks to said third means during the transverse movements of said support blocks relative to said mold cavities, means operable on the arrival of the lasts on said support blocks at said mold cavities to initiate automatically a molding and vulcanizing operation at said mold cavities, means operable at the end of the molding operation to actuate said third means to transversely move said support blocks away from said mold cavities to said lateral positions and to actuate said second means to move said support blocks from said lateral positions and along said guide means to said loading station, said engageable means breaking their interlocked relation to enable the return of said support blocks from said lateral positions to said loading station, and means operative on the arrival of said returning last support blocks at said loading station to actuate said first means to move said last support blocks transversely to move said returned support blocks out of cooperative relation with said guide means, and to move the other two support blocks for the other pair of lasts into such cooperative relation in position to be moved toward said molding cavities.

5. Apparatus for mechanically transporting lasts into and out of adjacently situated molds, comprising in combination, a vulcanizing station provided with a plurality of molds having adjacently situated mold cavities, a loading station spaced from said vulcanizing station, and guide means extending from said vulcanizing station to said loading station, a pair of lasts for each mold cavity, a movable support block for each of said lasts, a last carrier disposed transversely of said guide means and slidably supporting said support blocks in aligned relation thereon transversely of said guide means, first reciprocal drive means for moving said support blocks in such aligned relation transversely of said guide means to move either one pair of said lasts or the other pair thereof into cooperative relation with said guide means, second reciprocal drive means for moving said support blocks carrying the pair of lasts in cooperative relation with said guide means, along said guide means to positions laterally adjacent to said mold cavities, third reciprocal drive means operable on the arrival of said last support blocks at said lateral positions to transversely move said support blocks toward one another to move in the lasts thereof into said mold cavities, means on said support blocks and said third reciprocal drive means and engageable in interlocked relation in the region of said lateral positions to connect said support blocks to said third reciprocal drive means during the transverse movements of said support blocks relative to said mold cavities, means on movement of said support blocks toward said mold cavities to cause mold members to follow said support blocks to close the mold cavities, means operable on the arrival of the lasts on said support blocks at said mold cavities to initiate automatically a molding and vulcanizing operation at said mold cavities, means operable at the end of the molding operation to actuate said third reciprocal drive means to transversely move said support blocks away from said mold cavities to said lateral positions and to actuate said second reciprocal drive means to move said support blocks from said lateral positions and along said guide means to said loading station, said interlocking means breaking this interlocked relation in the region of said lateral positions to enable the return of said support blocks from said lateral positions to said loading station, and means operative on the arrival of said returning last support blocks at said loading station to actuate said first reciprocal drive means to move said last support blocks transversely to move said returned support blocks out of cooperative relation with said guide means, and to move the other two support blocks for the other pair of lasts into such cooperative relation in position to be moved toward said molding cavities.

6. Apparatus for mechanically transporting lasts into and out of adjacently situated molds comprising in combination, a vulcanizing station provided with a plurality of molds having adjacently situated mold cavities, a loading station spaced from said vulcanizing station and carrier means operable along a line of travel between said stations, a pair of lasts for each mold cavity, a movable support block for each of said lasts, said carrier means including two spaced platforms for supporting two of said support blocks in spaced relation, three block supporting platforms located at said loading station in aligned relation transversely of said line of travel, said three platforms being fixed relative to each other and being spaced apart to enable said two movable platforms to move therebetween and into aligned relation therewith, said fixed and movable platforms when in such aligned condition slidably supporting said support blocks in aligned rleation thereon, first means for moving said support blocks in said aligned relation transversely of said line of travel to move either one pair of said lasts or the other pair thereof onto said movable platforms of said carrier means, second means for moving said carrier means along said line of travel to bring the pair of last supporting blocks carried thereby from said loading station to positions laterally adjacent to said mold cavities, third means operable on the arrival of said carrier means in the region of said molding cavities for transversely movng said support blocks carried by said carrier means toward one another to move the lasts thereof into said mold cavities and for operating said molds to close said cavities, means operable at the end of a molding operation to actuate said third means to transversely move said last support blocks away from said mold cavities to said lateral positions and to actuate said second means to return said carrier means therewith to said loading station to realign said movable platforms with said fixed platforms, and means operable on the arrival of said carrier means at said loading station to actuate said first means to move said last support blocks transversely to move said returned support blocks transversely off said movable platforms of said carrier means and onto two of said fixed platforms, and to move the other two support blocks for the other pair of lasts off two of said fixed platforms and onto the two movable platforms of said carrier means.

7. Apparatus such as defined in claim 6, in which said third means includes first reciprocal means located at said lateral positions to move the support blocks on said carrier means toward and from said molding cavities transversely of said line of travel, said first reciprocal means and said support blocks being provided with means engageable in interlocked relation in the region of said lateral positions to connect said support blocks to said first reciprocal means during such transverse movements.

8. Apparatus such as defined in claim 7, in which said third means includes second reciprocal means operative on movement of said support blocks toward said mold cavities by said first reciprocal means, to cause mold members to follow said support blocks to close the mold cavities.

References Cited in the file of this patent

UNITED STATES PATENTS

| 2,029,195 | Riddock | Jan. 28, 1936 |
| 2,289,102 | Clark | July 7, 1942 |
| 2,907,068 | Vololek | Oct. 6, 1959 |
| 2,965,928 | Vdolek | Dec. 27, 1960 |

FOREIGN PATENTS

| 455,640 | Canada | Apr. 5, 1949 |
| 714,932 | Great Britain | Sept. 8, 1954 |